L. LLOYD.
HOSE CLAMP.
APPLICATION FILED MAR. 1, 1920.
1,386,343.  Patented Aug. 2, 1921.
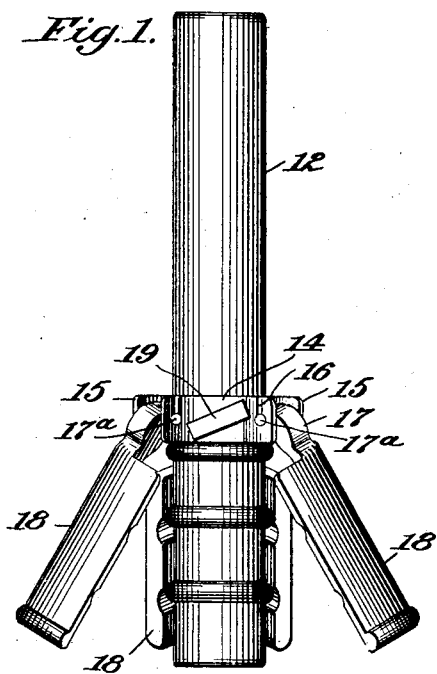
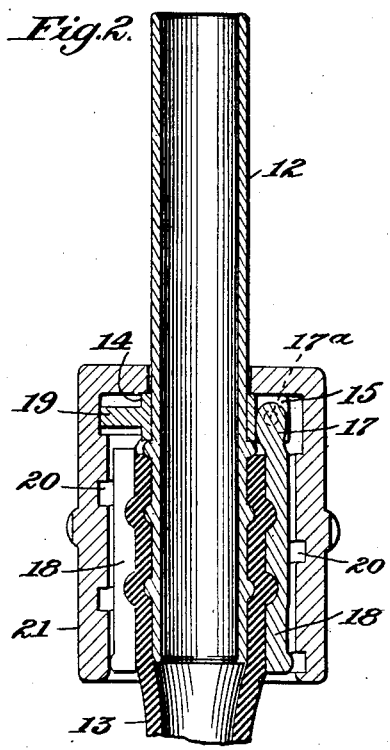
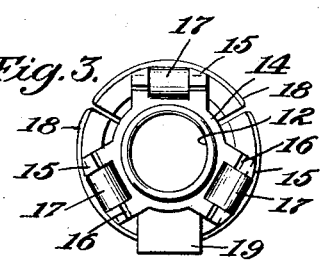
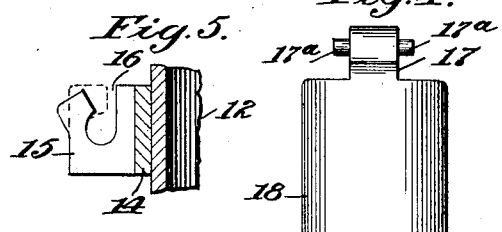
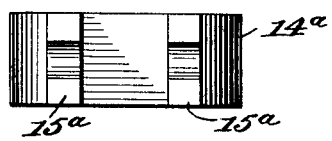
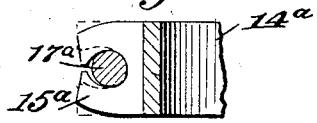
Inventor:
Lemuel Lloyd,
by ... Att'ys.

UNITED STATES PATENT OFFICE.

LEMUEL LLOYD, OF NEW YORK, N. Y., ASSIGNOR TO MARGARET R. ELKIN, OF NEW YORK, N. Y.

HOSE-CLAMP.

1,386,343.   Specification of Letters Patent.   Patented Aug. 2, 1921.

Application filed March 1, 1920. Serial No. 362,609.

*To all whom it may concern:*

Be it known that I, LEMUEL LLOYD, a subject of the King of Great Britain, residing at New York, in the county of New York and State of New York, have invented or discovered certain new and useful Improvements in Hose-Clamps, of which the following is a specification, reference being had therein to the accompanying drawing.

This invention relates to hose clamps of that class shown and described in U. S. Patent No. 1,091,819, dated March 21, 1914, to Charles Elkin, and consists in certain improvements in the form of hose attaching device or hose clamp covered by said patent whereby the construction may be cheapened and the durability increased. In the construction of hose clamp set forth in said patent the clamping arms are pivoted to lugs on a sleeve or collar attached to the pipe or nozzle, with which a rubber or other similar flexible hose is to be connected, by means of pins passing through said lugs. This construction requires some care and trouble in inserting the pivot pins and in riveting them in place. In the present instance the clamping arms are provided with pivot pins which are preferably integral with the arms, as will hereinafter more fully appear, and which pivot pins may be inserted in slitted lugs on the fixed sleeve or collar, said lugs being subsequently slightly bent inward to secure the pivot pins in place.

Also in the construction shown in the said patent the pin which enters a spiral track in the clamping ring or sleeve is somewhat slender and not capable of withstanding, for a long time, the wear to which it may be subjected. In the present instance the sleeve or ring which is attached to the pipe or nozzle is provided with an inclined lug fitting the spiral groove in the clamping sleeve or ring and which lug is of sufficient size and strength to withstand any wear to which it may be subjected.

In the accompanying drawing Figure 1 is an elevation of the improved hose clamp with the parts in unclamped position. Fig. 2 is a sectional view of the same with the parts in clamped position. Fig. 3 is a top view or end view of the improved clamp with the clamping ring or sleeve omitted. Fig. 4 is a detail view of one of the clamping arms, and Fig. 5 is a detail view to show one of the slitted lugs on the collar attached to the pipe or nozzle. Figs. 6 and 7 are detail views illustrating a modified form of sleeve or collar with slitted lugs for engaging the pivot pins on the clamping arms.

Referring to the drawing, 12 denotes a pipe or nozzle to which a rubber hose 13 or the like is to be attached. Secured to the pipe or nozzle 12, preferably by being shrunk thereon, is a sleeve or collar 14 having radially projecting lugs 15 which may be slitted at their tops, as at 16, so that when bent outward, as denoted by dotted lines in Fig. 5, the pins 16, preferably formed integral with lugs 17 on the clamping arms 18, may be engaged with said slitted lugs, which latter are then bent inward to the position shown in full lines in Fig. 5, thereby pivotally attaching the clamping arms to the lugs 15 on the sleeve or collar 14. This method of pivotally mounting the clamping arms in place enables the parts to be quickly and conveniently assembled, as all of the slitted lugs on the collar can be bent inward to hold the clamping arms in place by a single operation of a suitable tool.

The sleeve or collar 14 is provided with a broad inclined lug 19 fitting a spiral groove 20 formed on the inside of the clamping ring or sleeve 21, the inclined lug 19 being of sufficient size and strength to withstand the wear to which it is likely to be subjected.

In the construction shown in Figs. 6 and 7 the sleeve or collar 14ª is provided with radial lugs 15ª which are slitted at their peripheries or outer edges, and in attaching the clamping arms 16 to the said sleeve or collar the pins 17 on said arms may be inserted in these slitted lugs when the latter are open as indicated by dotted lines in Fig. 7 after which these lugs may be bent toward each other as shown in full lines in Fig. 7, thereby securely holding the pivoted clamping arms 18 in place.

From the foregoing it will be understood that the invention provides an improved construction of hose clamp which may be cheaply manufactured and which will be very durable in use.

Having thus described my invention I claim and desire to secure by Letters Patent:

1. The combination with a pipe or delivery nozzle, of a sleeve or collar attached thereto and provided with outwardly projecting slitted lugs, and clamping arms having pins adapted to be engaged with said lugs which latter, when closed together, will pivotally secure the said clamping arms in place.

2. The combination with a pipe or delivery nozzle, of a sleeve or collar attached thereto and provided with outwardly projecting slitted lugs, and clamping arms having pins adapted to be engaged with said lugs which latter, when closed together, will pivotally secure the said clamping arms in place, said clamping arms having lugs fitting between said projections on said sleeve or collar, and having pivot pins which are formed integral with said last-named lugs.

3. The combination with a pipe or nozzle provided with a fixed sleeve or collar having a broad inclined lug, and clamping arms pivotally connected with said sleeve or collar, and a clamping ring or sleeve having a spiral groove or track engaged by said inclined lug on said fixed sleeve or collar.

In testimony whereof I affix my signature.

LEMUEL LLOYD.